(No Model.)
O. G. TARVER.
COTTON SEED PLANTER.
No. 391,867. Patented Oct. 30, 1888.
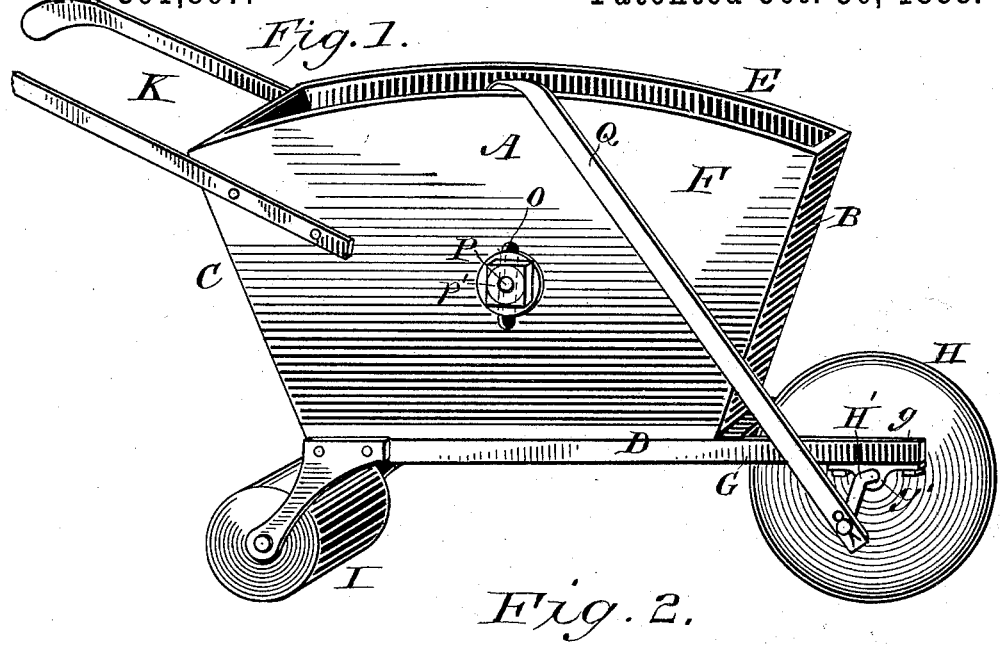
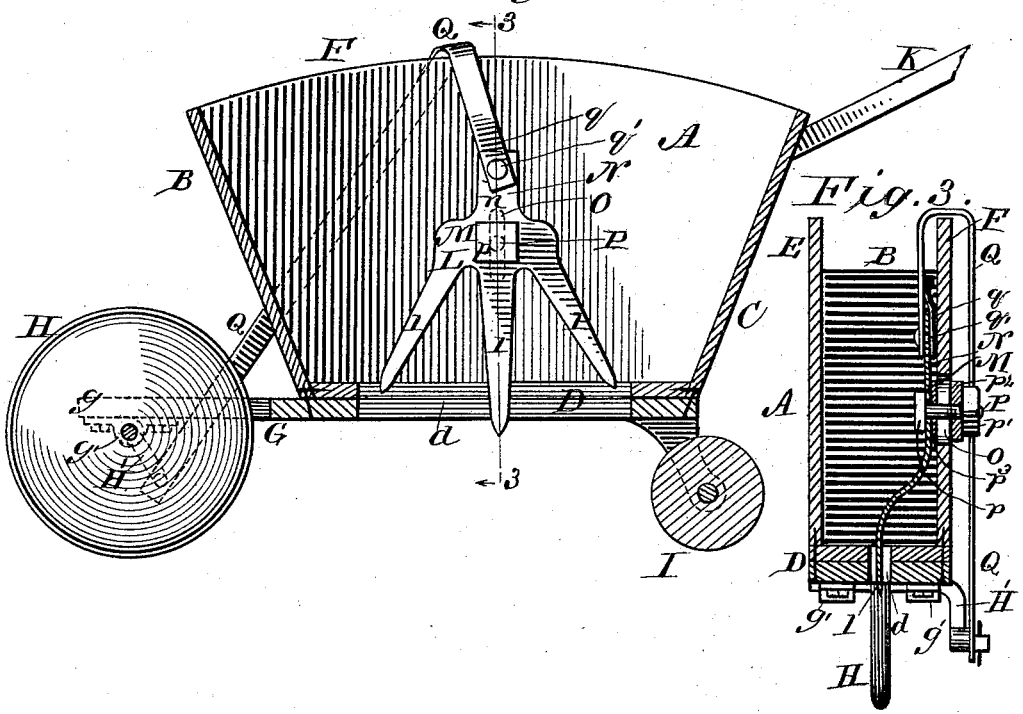
WITNESSES,
H. C. Newman,
E. S. Newman,
INVENTOR.
Oliver G. Tarver,
By his Attorneys
Baldwin Davidson & Wight.

UNITED STATES PATENT OFFICE.

OLIVER GOLDSMITH TARVER, OF BURKE COUNTY, GEORGIA.

COTTON-SEED PLANTER.

SPECIFICATION forming part of Letters Patent No. 391,867, dated October 30, 1888.

Application filed June 8, 1888. Serial No. 276,439. (No model.)

*To all whom it may concern:*

Be it known that I, OLIVER GOLDSMITH TARVER, of Burke county, Georgia, (P. O. address, Hephzibah, Richmond county, Georgia,) have invented certain new and useful Improvements in Cotton-Seed Planters, of which the following is a specification.

My invention relates to that class of cotton-seed planters in which a hopper carrying the seed and having a feed-opening at the bottom is provided with a stirrer, agitator, or helper to loosen the seed in the hopper and insure its regular delivery through the feed-opening.

My invention consists, first, in attaching the stirrer, agitator, or helper to one only of the inner sides of the hopper and arranging the agitator to work over and in the feed-opening; second, in providing the agitator with a vertically-adjustable bearing on one side of the hopper; third, in connecting the agitator to a crank-arm on the furrow-wheel in advance of the hopper by a pitman-rod extending over the top of the hopper.

It also consists in certain details of construction and organizations of instrumentalities hereinafter set forth.

In the accompanying drawings, illustrating my invention, Figure 1 is a side view of my improved cotton-seed planter. Fig. 2 is a side view of the interior thereof, and Fig. 3 a vertical central section on the line 3 3 of Fig. 2.

The hopper A may be of any suitable shape, but preferably such as shown in the drawings, the front and rear ends, B and C, being inclined inwardly from top to bottom and attached to the base-piece D. The sides E and F are secured to the base-piece and to the end pieces, as indicated, and their upper edges are preferably curved, as shown. The base-piece is provided with an elongated slotted opening, $d$, through which the cotton-seeds are fed. The base-piece D is provided with an extension, G, bifurcated, as shown. Between the arms $g$, on the bifurcated extension G, in suitable bearings, $g'$, is journaled the furrow-making wheel H. This wheel may be of any well-known construction, preferably that shown in the drawings. A crank-arm, H', is secured to the journal of the wheel, or otherwise connected with the wheel to rotate therewith. The rear end of the planter may be supported by roller-wheel I, and the planter may be provided with handles K, as indicated. These parts last named do not constitute a part of my invention. The agitator L is shown as consisting of three fingers, $l$, preferably pointed at their lower ends, which extend into the slotted opening in the bottom of the hopper. The fingers are connected at their upper ends to a common cross-piece, M, from which extends an arm, N. A vertical slot, O, is formed in the side F, through which extends a short bolt or stud journal, P. This bolt extends through a hole in the cross-piece M, and is provided with a head, $p$, close to the cross-piece M. The outer end of the bolt or stud journal P is screw-threaded, as shown, and is provided with an adjusting-nut, $p'$. Between the nut and the side of the hopper is interposed a washer, $p^2$. A washer, $p^3$, may also be interposed between the cross-piece M and the inner side of the hopper. The arm N, which extends upwardly from the cross-piece M, is connected with the crank-arm of the furrow-wheel by a pitman-rod, Q. The rod extends from the crank-arm over the top of the side F, and is provided at its upper end with a bifurcated end, $q$, which embraces the end of the arm N, and a pivot-bolt, $q'$, extends through the arms $q$ and the arm N. While the cross-piece M lies flat against the side of the hopper, the fingers are properly bent, as shown, to cause their outer ends to enter and work in the slot $d$, which is formed centrally in the bottom of the hopper.

I have described the details of construction of the planter as shown in the drawings; but my invention is not necessarily limited to these details, as obviously there are many modifications which come within the scope of my invention. As the planter advances the furrow-wheel opens a way for the cotton-seed, and the revolutions of the crank oscillate the agitator about its axis P, so as to cause the agitating-fingers to move back and forth in the slot, and open a way for the cotton-seed and force the seed through the opening.

It will be observed that the working parts of the agitator are confined to one side of the hopper. The journal or axle does not extend across the hopper, as is usual in this class of machines, and the pitman-rod works close to the side of the hopper. The fingers may be adjusted vertically in the hopper by loosening the adjusting-nut and lifting or lowering the bolt in the slot. The bolt may be held in any desired position by tightening the nut.

Having thus described my invention, what I claim as new, and desire to secure by Letters Patent of the United States, is—

1. The combination, substantially as hereinbefore set forth, of the hopper having a feed-opening at the bottom, the agitator pivoted to one side only of the hopper, the crank-carrying wheel, and the pitman connecting the crank-carrying wheel to the agitator.

2. The combination, substantially as hereinbefore set forth, of the hopper, the agitator pivoted to one side only of the hopper, the crank-carrying wheel, and the pitman-rod extending from the crank over the top of the hopper and connected to the agitator.

3. The combination, substantially as hereinbefore set forth, of the hopper, the agitator consisting of a series of fingers extending from a common cross-piece, M, an upwardly-extending arm connected to the cross-piece, the short journal-bolt extending through the cross-piece and through one side only of the hopper, a crank-carrying wheel, and the pitman-rod connected thereto and having a bifurcated upper end hinged to vertical arm of the agitator.

4. The combination, substantially as hereinbefore set forth, of the hopper having a feed-opening at the bottom, the agitator pivoted to one side only of the hopper, the crank-carrying wheel, the pitman connecting the crank-carrying wheel to the agitator, and means for adjusting the agitator vertically.

In testimony whereof I have hereunto subscribed my name.

OLIVER GOLDSMITH TARVER.

Witnesses:
A. W. TARVER,
R. L. RHODES.